United States Patent [19]

Miyazaki et al.

[11] Patent Number: 5,761,395
[45] Date of Patent: Jun. 2, 1998

[54] APPARATUS FOR AND METHOD OF CONTROLLING OUTPUT

[75] Inventors: Yuki Miyazaki, Kawasaki; Toshiya Goto, Tokyo, both of Japan

[73] Assignee: Canon Kabushiki Kaisha, Tokyo, Japan

[21] Appl. No.: 899,893

[22] Filed: Jul. 24, 1997

Related U.S. Application Data

[63] Continuation of Ser. No. 353,904, Dec. 12, 1994.

[30] Foreign Application Priority Data

Dec. 15, 1993 [JP] Japan ................................. 5-313902
Dec. 1, 1994 [JP] Japan ................................. 6-298396

[51] Int. Cl.$^6$ ........................................... G06K 15/00
[52] U.S. Cl. ................................... 395/110; 395/102
[58] Field of Search ........................... 395/102, 110, 395/112, 167, 139, 172; 345/128, 141, 142, 143; 400/61, 62, 70, 72, 76; 358/470; 382/298

[56] References Cited

U.S. PATENT DOCUMENTS

| | | | |
|---|---|---|---|
| 4,594,674 | 6/1986 | Boulia et al. | 395/110 |
| 4,686,525 | 8/1987 | Nagata | 340/790 |
| 4,930,087 | 5/1990 | Egawa et al. | 364/518 |
| 5,167,013 | 11/1992 | Kobe et al. | 395/110 |
| 5,345,548 | 9/1994 | Nomura et al. | 395/150 |

FOREIGN PATENT DOCUMENTS

| | | |
|---|---|---|
| 0425218 | 5/1991 | European Pat. Off. |
| 0478339 | 4/1992 | European Pat. Off. |
| 0571169 | 11/1993 | European Pat. Off. |
| 2211970 | 7/1989 | United Kingdom |
| 2217491 | 10/1989 | United Kingdom |

OTHER PUBLICATIONS

Patent Abstracts of Japan, vol. 17, No. 268 (M-1416) May 25, 1993 & JP-A-05-004 389 (Minolta Camera Co. Ltd.) Jan. 14, 1993.

*Primary Examiner*—Arthur G. Evans
*Attorney, Agent, or Firm*—Fitzpatrick, Cella, Harper & Scinto

[57] ABSTRACT

An output control apparatus which delivers a character pattern in accordance with a character generating request from a host computer and which selects one of a plurality of fonts in accordance with data designated by the host computer, comprising means of selecting a font of characters to be outputted in accordance with an attribute thereof, memory means for storing therein a plurality of font data and a plurality of font scalers, means for setting degrees of priority of the plurality of font scalers, and means for selecting a font of characters to be outputted in accordance with a degree of priority set by the setting means at the time when said font of characters to be outputted is selected.

26 Claims, 19 Drawing Sheets

FIG. 2

| FLAG | NAME | ATTRIBUTES | | | | | | | FONT POINTER | SAME ATTRIBUTE POINTER | SCALER INDEX |
|---|---|---|---|---|---|---|---|---|---|---|---|
| | | GS | PITCH | SIZE | STYLE | STRK | TYPE | SUB | | | |
| 1 | MINCHO | C0 | 10 | 7.2 | 0 | 0 | 80 | 0 | XXXX | XXXX | 0 |
| 0 | MINCHO | 4A | 20 | 7.2 | 0 | 0 | 80 | 0 | XXXX | XXXX | 0 |
| 0 | MINCHO | 49 | 20 | 7.2 | 0 | 0 | 80 | 0 | XXXX | XXXX | 0 |
| 1 | GOTHIC | C0 | 10 | 7.2 | 0 | 0 | 81 | 0 | XXXX | XXXX | 0 |
| | | | | | | | | | | | |
| 0 | ROUND GOTHIC | C0 | 10 | 7.2 | 0 | -1 | 82 | 0 | XXXX | XXXX | 3 |
| 0 | ROUND GOTHIC | 4A | 20 | 7.2 | 0 | -1 | 82 | 0 | XXXX | XXXX | 3 |
| 0 | ROUND GOTHIC | 49 | 20 | 7.2 | 0 | -1 | 82 | 0 | XXXX | XXXX | 3 |

| INDEX | SCALER NAME | SCALER LEVEL | STORAGE | FUNCTION POINTER |
|---|---|---|---|---|
| 0 | SCALER A | 10 | REGISTERED | XXXX |
| 1 | SCALER B | 7 | INTERNAL | XXXX |
| 2 | SCALER C | 4 | REGISTERED | XXXX |
| 3 | SCALER D | 4 | INTERNAL | XXXX |
| 4 | SCALER X | 2 | REGISTERED | XXXX |
| 5 | SCALER Y | 2 | REGISTERED | XXXX |
| 6 | SCALER Z | 2 | INTERNAL | XXXX |

HIGHER ←—— PRIORITY ——→ LOWER

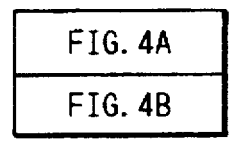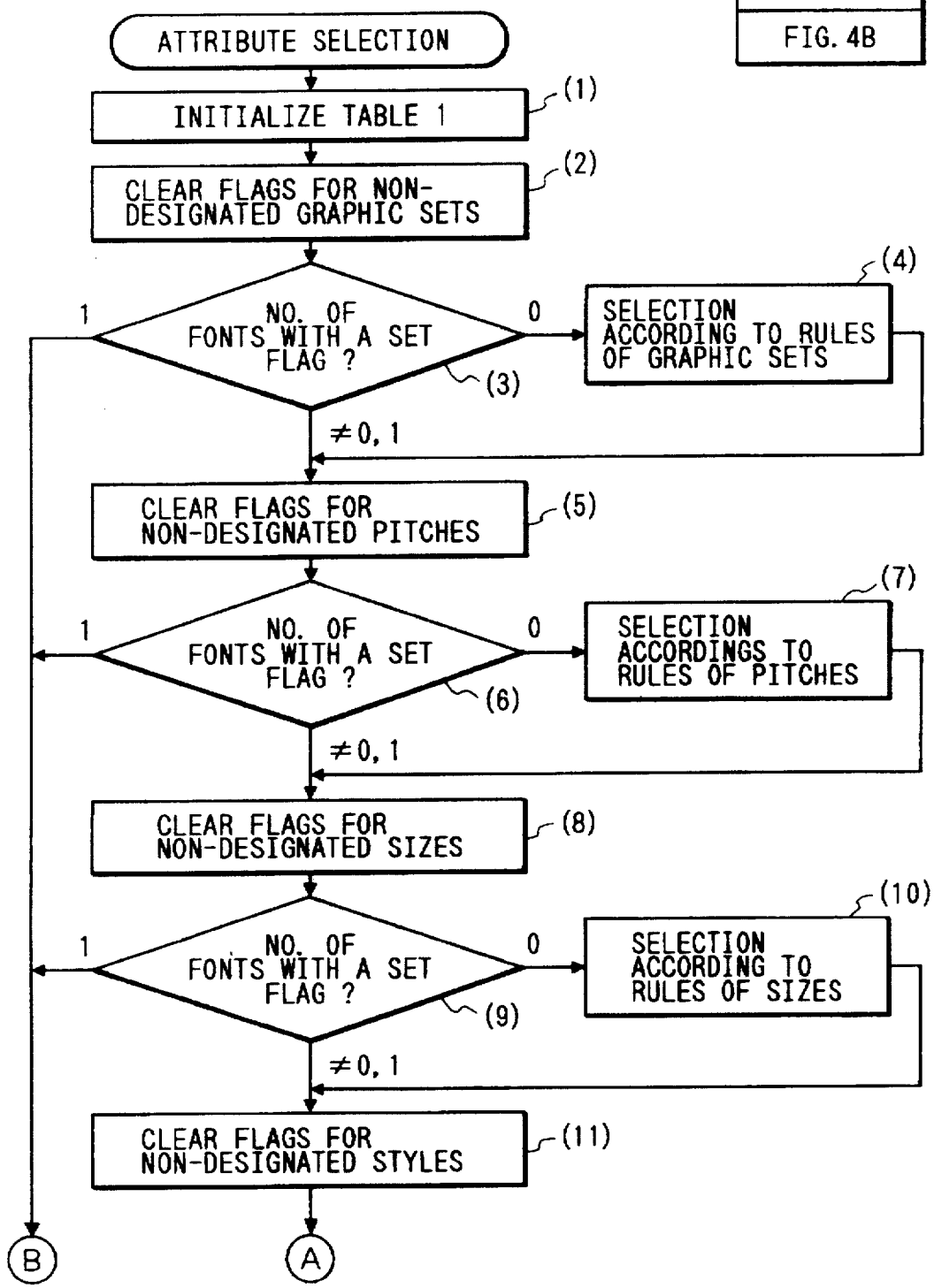

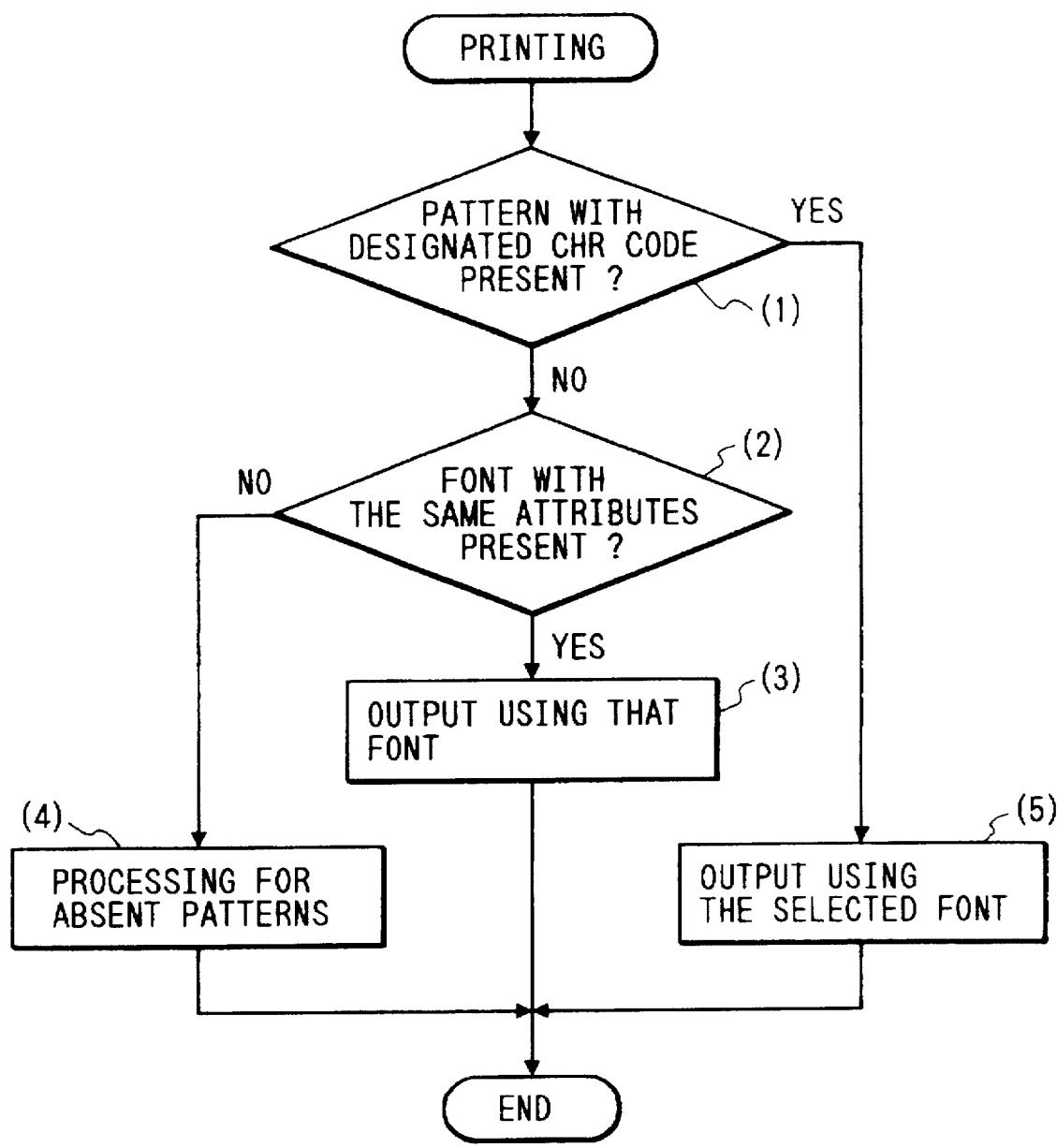

FIG. 6

| FONT LIST | | | | | | | 2 |
|---|---|---|---|---|---|---|---|
| NAME | | | ATTRIBUTES | | | | |
| | GS | PITCH | SIZE | STYLE | STROK | TYPE | SUB |
| MINCHO | CO | 10 | 7.2 | 0 | 0 | 80 | 0 |

| SCALER LIST | | | 1 |
|---|---|---|---|
| INDEX | SCALER NAME | SCALER LEVEL | STORAGE |
| 0 | SCALER A | 10 | REGISTERED |
| 1 | SCALER B | 7 | INTERNAL |
| 2 | SCALER C | 4 | REGISTERED |
| 3 | SCALER D | 4 | INTERNAL |
| 4 | SCALER X | 2 | REGISTERED |
| 5 | SCALER Y | 2 | REGISTERED |
| 6 | SCALER Z | 2 | INTERNAL |

FIG. 12

| FLAG | NAME | ATTRIBUTES ||||||| FONT POINTER | SAME ATTRIBUTE POINTER | FUNCTION POINTER |
|---|---|---|---|---|---|---|---|---|---|---|---|
| | | GS | PITCH | SIZE | STYLE | STRK | TYPE | SUB | | | |
| 1 | MINCHO | C0 | 10 | 7.2 | 0 | 0 | 80 | 0 | XXXX | XXXX | XXXX |
| 0 | MINCHO | 4A | 20 | 7.2 | 0 | 0 | 80 | 0 | XXXX | XXXX | XXXX |
| 0 | MINCHO | 49 | 20 | 7.2 | 0 | 0 | 80 | 0 | XXXX | XXXX | XXXX |
| 1 | GOTHIC | C0 | 10 | 7.2 | 0 | 0 | 81 | 0 | XXXX | XXXX | XXXX |
| 0 | ROUND GOTHIC | C0 | 10 | 7.2 | 0 | -1 | 82 | 0 | XXXX | XXXX | XXXX |
| 0 | ROUND GOTHIC | 4A | 20 | 7.2 | 0 | -1 | 82 | 0 | XXXX | XXXX | XXXX |
| 0 | ROUND GOTHIC | 49 | 20 | 7.2 | 0 | -1 | 82 | 0 | XXXX | XXXX | XXXX |

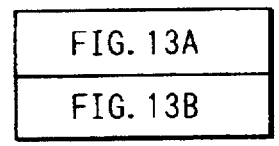
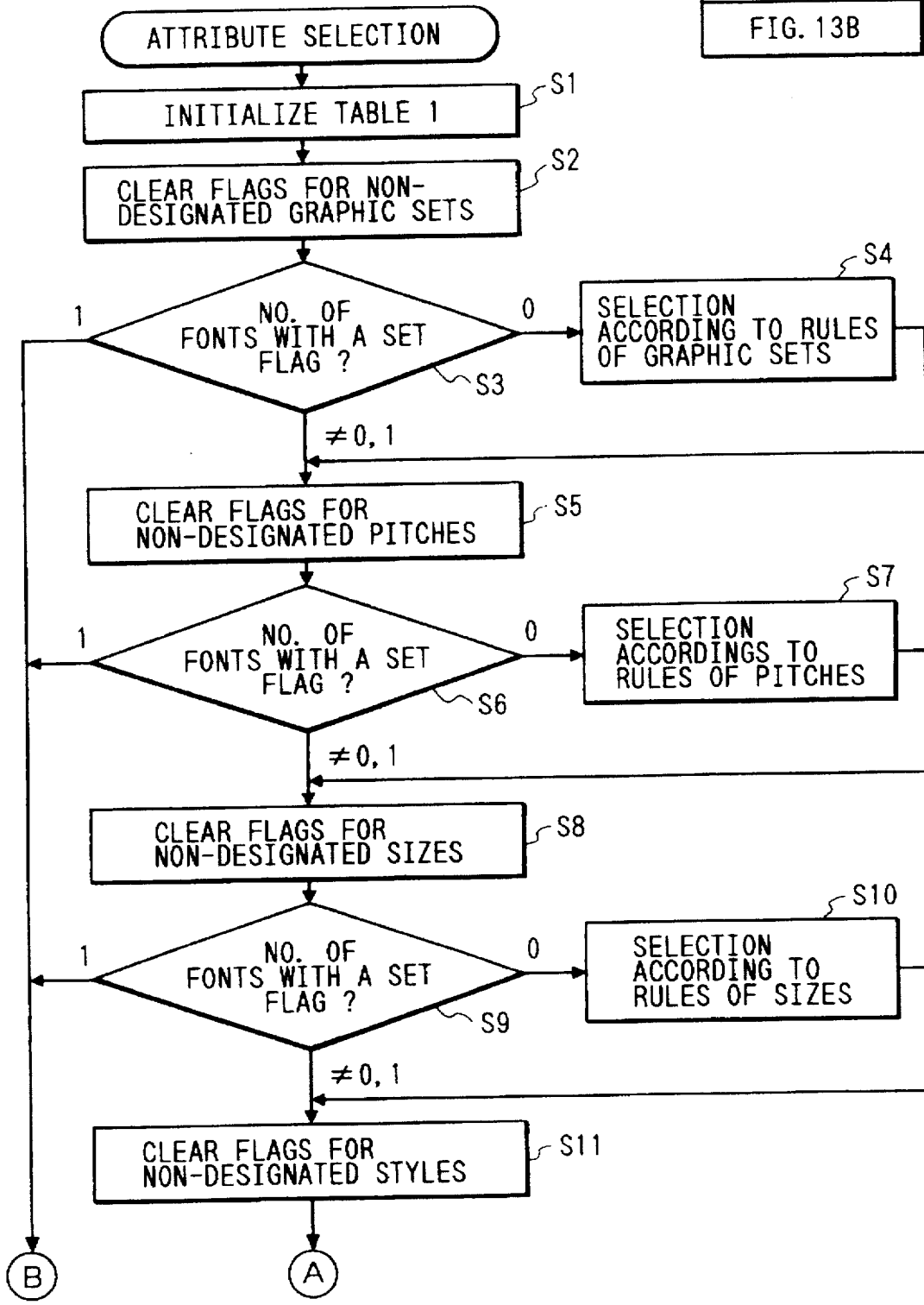
FIG. 13A

| FLAG | NAME | ATTRIBUTES ||||||| FONT POINTER | SAME ATTRIBUTE POINTER |
|---|---|---|---|---|---|---|---|---|---|---|
| | | GS | PITCH | SIZE | STYLE | STRK | TYPE | SUB | | |
| 1 | MINCHO | C0 | 10 | 7.2 | 0 | 0 | 80 | 0 | XXXX | XXXX |
| 0 | MINCHO | 4A | 20 | 7.2 | 0 | 0 | 80 | 0 | XXXX | XXXX |
| 0 | MINCHO | 49 | 20 | 7.2 | 0 | 0 | 80 | 0 | XXXX | XXXX |
| 1 | GOTHIC | C0 | 10 | 7.2 | 0 | 0 | 81 | 0 | XXXX | XXXX |
| 0 | ROUND GOTHIC | C0 | 10 | 7.2 | 0 | -1 | 82 | 0 | XXXX | XXXX |
| 0 | ROUND GOTHIC | 4A | 20 | 7.2 | 0 | -1 | 82 | 0 | XXXX | XXXX |
| 0 | ROUND GOTHIC | 49 | 20 | 7.2 | 0 | -1 | 82 | 0 | XXXX | XXXX |

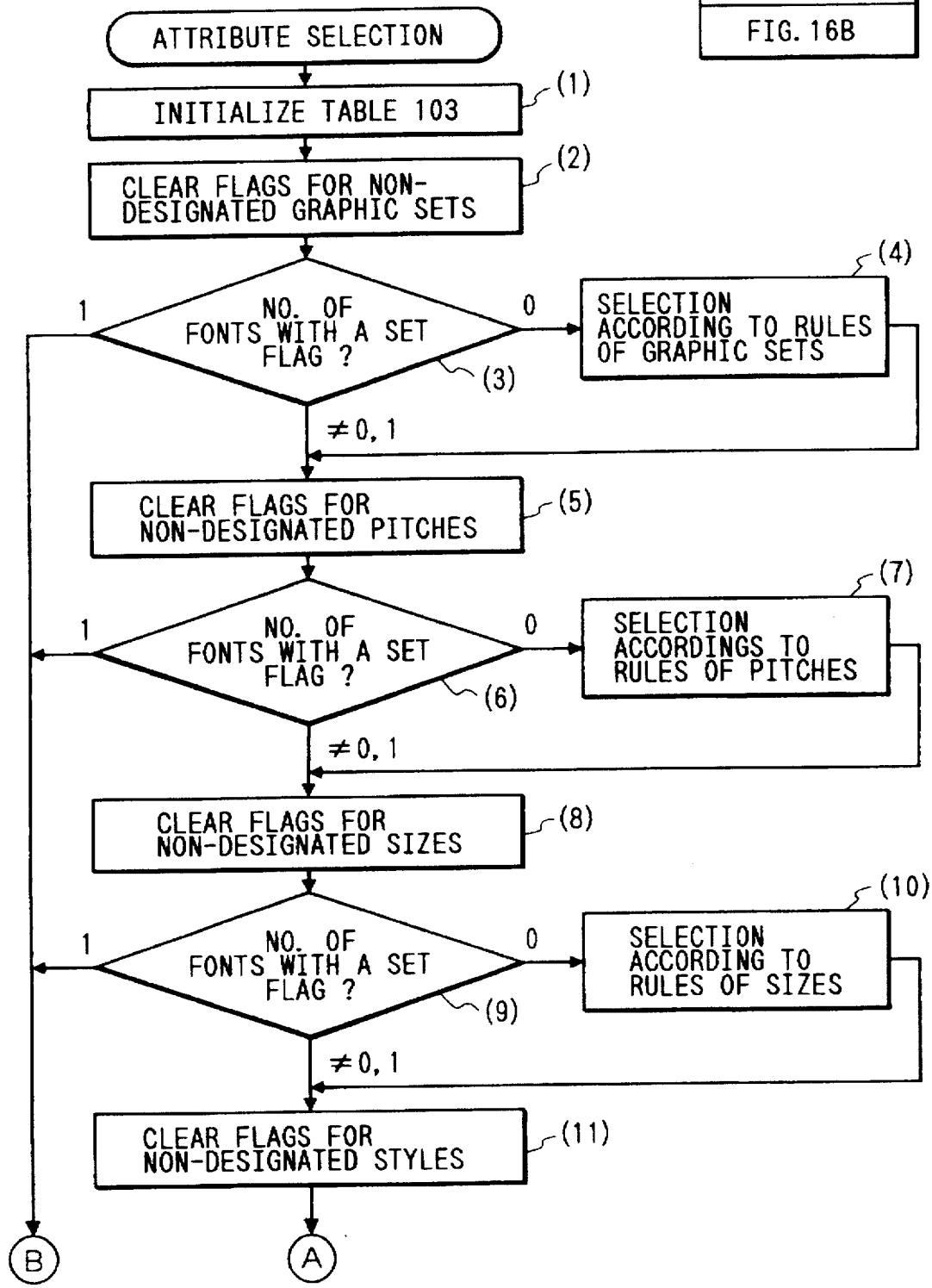

FIG. 17A
| NO. OF FONTS WITH SAME ATTRIBUTES | HIGHER PRIORITY ←——→ LOWER PRIORITY | | | |
|---|---|---|---|---|
| 3 | FONT A | FONT B | FONT C | — |
|  |  |  |  |  |
|  |  |  |  |  |
FIG. 17B
INTERNAL FONT (MINCHO)
FONT C
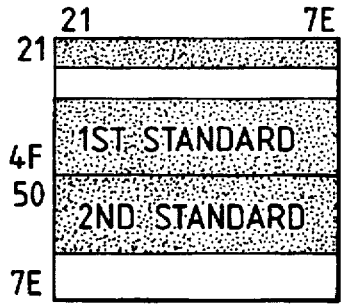
REGISTERED FONT (MINCHO)
FONT B
(REGISTERED EARLIER THAN FONT A)
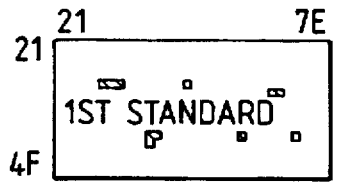
CODES WITH PRESENT PATTERNS
C B A
FONT A
(REGISTERED LATER THAN FONT B)
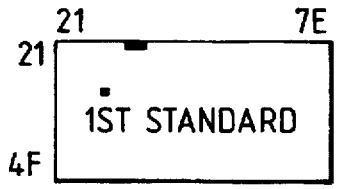
FIG. 17C
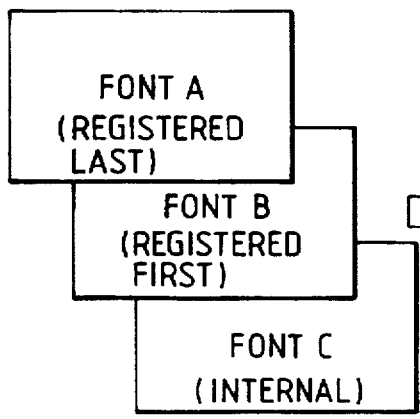
FONT A (REGISTERED LAST)
FONT B (REGISTERED FIRST)
FONT C (INTERNAL)
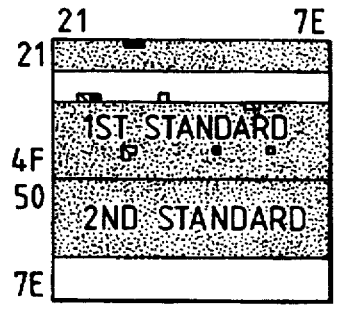

APPARATUS FOR AND METHOD OF CONTROLLING OUTPUT

This application is a continuation of application Ser. No. 08/353,904 filed Dec. 12, 1994.

BACKGROUND OF THE INVENTION

1. Field of the Invention

The present invention relates to an output control apparatus for outputting a character pattern in response to a character generating request delivered from a host computer, and in particular to an output device having a plurality of fonts, for selecting a font of characters in accordance with data designated by the host computer.

2. Related Background Art

These years, an electrophotographing type printing device such as a laser printer incorporates in general a plurality of fonts, from which a font to be used by a host computer is selected and set by a printer command, at a panel, etc., and is then printed. As such a method of selecting a font, a method of designating a name of a font, and a method of selecting a font in accordance with an attribute of a font are used.

The above-mentioned font selecting method in accordance with an attribute of a font, comprises the steps of: providing a plurality of attributes of fonts, and storing data for these attributes in tables (font tables) each for each font, and dropping out fonts having attributes different from a designated attribute, in the order of descending priority so as to a finally remaining font.

Explanation will be hereinbelow made of a prior art example relating to the present invention with reference to the drawings. FIG. 14 is a block diagram explaining the constitution of a printing device of this kind.

Referring to this figure, a printing device 100 in this prior art example, is adapted to prepare a printed result 200 in accordance with printing data delivered from a host computer 300.

The printing device 100 incorporates therein a CPU 101 for controlling the operation of the printing device in its entirety, and other components which will be hereinbelow explained.

A receiving buffer 108 temporarily stores therein data from the host computer 300, and a font memory 102 stores therein outline font data (which is may be stroke type font data). Further, a font table 103 has attributes of incorporated fonts, and pointers for pattern data in the form of a table, a page buffer memory 104 for storing therein received data, a bit map memory 105 for developing image data for a one page, and a printer engine part 107 for actually carrying out printing in accordance with the image data developed in the bit map memory 105.

Referring to FIG. 15 which is a view showing the data structure of the font table 103 shown in FIG. 14, font table 103 is composed of all names of fonts included in the printing device, attributes, pointers and flags. Incorporated fonts, fonts in font cards and fonts registered by the user are arranged in the table in the mentioned order.

In the case of printing being made by searching the table for a designated font, the priority order of the attributes is such as a graphic set, character pitches, character sizes, styles, stroke weights, type faces and auxiliary type faces which are arranged in the descending order. The font is selected in accordance with this priority order.

FIG. 16, comprised of FIG. 16A and FIG. 16B, shows flow-charts illustrating an example of font selecting procedures in a conventional printing device, which comprises steps (1) to (23). When an attribute of a font is designated by a command or by setting a panel, the process of searching fonts, including the other attributes set at that time is carried out.

First, at step (1), all flags for fonts in the font tables 103 are set. Further, at step (2), flags of fonts other than a designated graphic set are all cleared, and then whether the number of fonts for which flags are raised is one or not is determined (step (3)).

If it is one at this determination, the printing is carried out using the font. Further, if no font having a raised flag is present, a flag for a font in the graphic set which is set at present is set under a selecting rule for the graphic set (step (4)).

Further, if some fonts for which flags are set remain, the procedure is advanced to step (5), where the flags for fonts other than those having designated character pitches are cleared, and the number of remaining fonts is checked (step (6), similar to the case of the above-mentioned graphic set. If it is one, it is determined, but if no one is present, the processing is carried out under a selecting standard (step (7)). If some fonts are still present, the procedure is carried out for the process for the next attribute.

Thereafter, the character sizes, the styles, the stoke weights, the type faces and the auxiliary type faces are similarly processed (steps (8) to (22)). If only of them cannot be finally selected, a font for which a last flag in the font table is set, is selected (step (23)).

FIGS. 17A to 17C are views showing a same-attribute font table and a same-attribute font process in a printing apparatus of this kind. Referring to FIG. 17A which shows the same-attribute font table in which fonts having the same attribute are registered so as to permit a prompt search for fonts having the same attribute in the font table, the fonts are arranged in descending priority order.

Further, this same-attribute font table is linked from the font table shown in FIG. 15 by the pointers.

FIG. 17B shows the presence of patterns in a code table of actual registered fonts, corresponding to details of the fonts shown in FIG. 17A. FIG. 17C shows output patterns of the same-attribute fonts. A pattern of a font A is preferentially outputted, but a pattern of a font C is outputted only when a code of a pattern which is not present either in the font A or a font B is designated.

Actually, when fonts having the same attribute fonts are selected, only one of them can be finally selected, and accordingly, a final font in the table is selected. Thus, if a font having a high priority rank, that is, fonts registered by the user are present, the registered fonts (the font B rather than the font C) are selected preferentially to the incorporated fonts, and of the registered fonts, the newest registered font (the font A rather than the font B) is selected.

When characters in the selected font are printed, if no patterns are present in designated character codes, whether a font having the same attribute is present or not is confirmed. If a font having the same attribute is present, the characters are outputted in the patterns of the font.

Accordingly, when codes to be actually printed are designated after the font A is selected, if the codes of the font A do not patterns, then its determined whether the font having the next higher priority (the font B) has patterns or not. If it has patterns, the patterns are outputted, but if it has not, whether a font having the next higher priority has patterns or not is checked, and if it has not, the patterns are outputted, but if it has not and further if no other fonts having the same attribute is present, a process having no patterns is carried out.

With the above-mentioned steps, the user registers font having the same attribute so as to carry out the user's process.

For example, with a dot font character pattern having a size of 50×50, a character having attributes a graphic set JIS 8, fixed pitches, an upright posture, a medium and a Mingcho type, is set, and after a scalable font conversion is carried out, it is registered at a character code 302 so that the character registered by the use (that is, an external character) is printed without changing fonts, whereby character pattern registered by the user is outputted.

SUMMARY OF THE INVENTION

However, in the above-mentioned conventional example, it is not assumed that no plurality of font scalers are present in the printer, and it is expected that typical Japanese fonts are present in font formats with font scalers, having similar attributes if a plurality of font scalers can be present in a printer by down-loading or the like.

Thus, when a plurality of fonts having the same attribute are present in the printer, the conventional attribute selection can hardly select a font expected by the user.

Further, as the kinds of usable scalers increase, it is more and difficult to handle a font having the same attribute as an external character, as conventionally done.

The present invention is devised in order to eliminate the above-mentioned problems, and accordingly, one object to the present invention is to provide an output control apparatus in which the preferential rank of a registered scaler is stored in memory so as to select a font to be used upon generation of a character pattern corresponding to character data, and therefore the selection of a font adaptable to the users's use purpose can be selected and outputted, and thereby it is possible to carry out a character process which is friendly to the user, and in which the conditions of a registered external character and a registered scaler are determined so as to control the generation of a pattern of a registered external character, thereby it is possible to carry out an external character process which is friendly to the user.

BRIEF DESCRIPTION OF THE DRAWINGS

FIG. 2 is a view illustrating a font table shown in FIG. 1, in detail;

FIG. 3 is a view illustrating a scaler data table shown in FIG. 1, in detail;

FIG. 5 is a flow-chart showing an example of a printing process according to the present invention;

FIG. 6 is a view illustrating an output example of a font list in the printing device according to the present invention;

FIG. 12 is a view illustrating a font table in the other embodiment of the present invention;

FIG. 15 is a view illustrating a font table shown in FIG. 14;

FIGS. 17A to 17C are views illustrating a same-attribute font table and for explaining a same-attribute font process, in the conventional printing device of the kind shown in FIG. 14.

DESCRIPTION OF THE PREFERRED EMBODIMENTS

Figure 1:
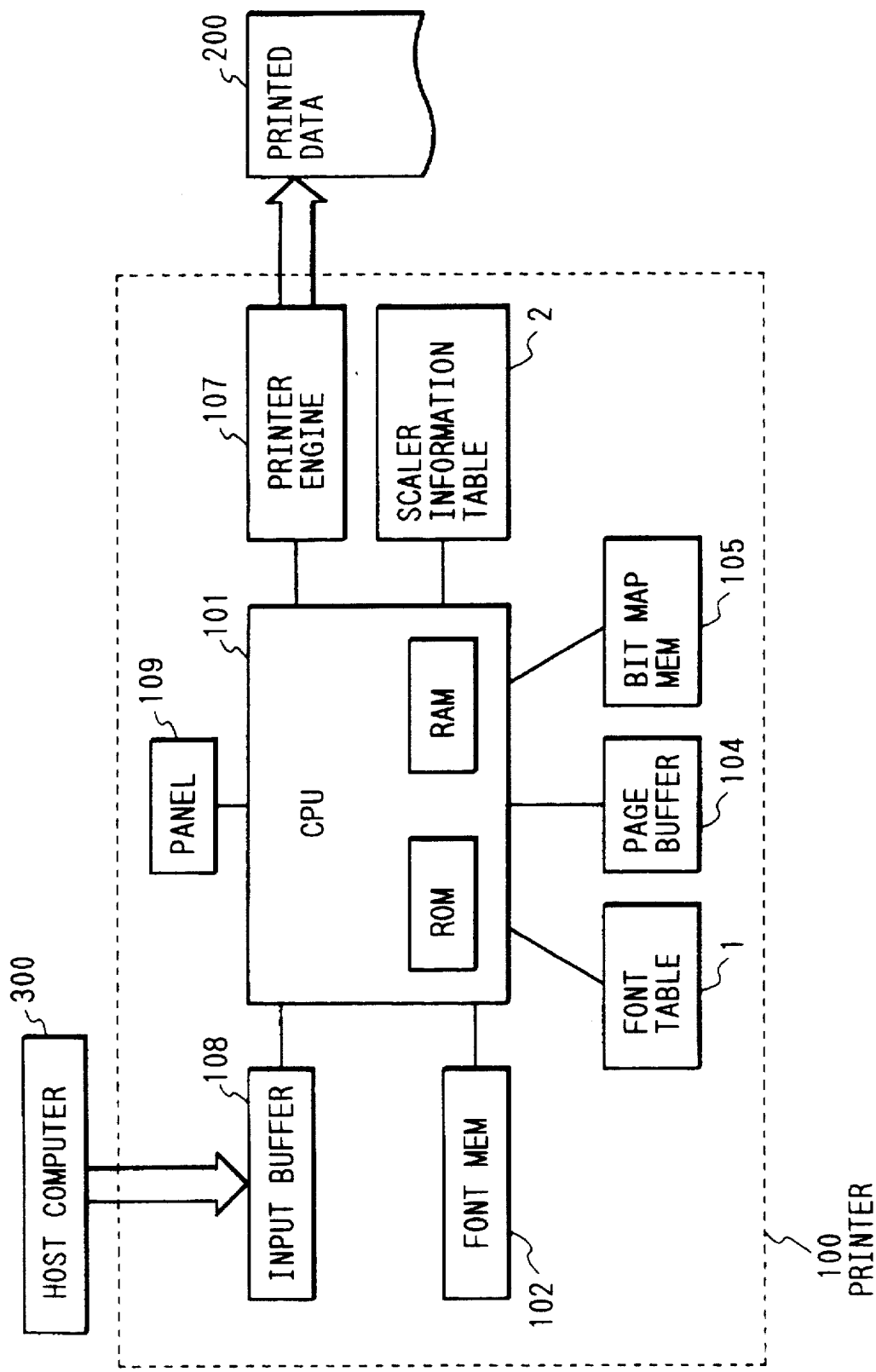
FIG. 1 is a block diagram for explaining a control arrangement of a printing device in one embodiment of the present invention.
Figure 14:
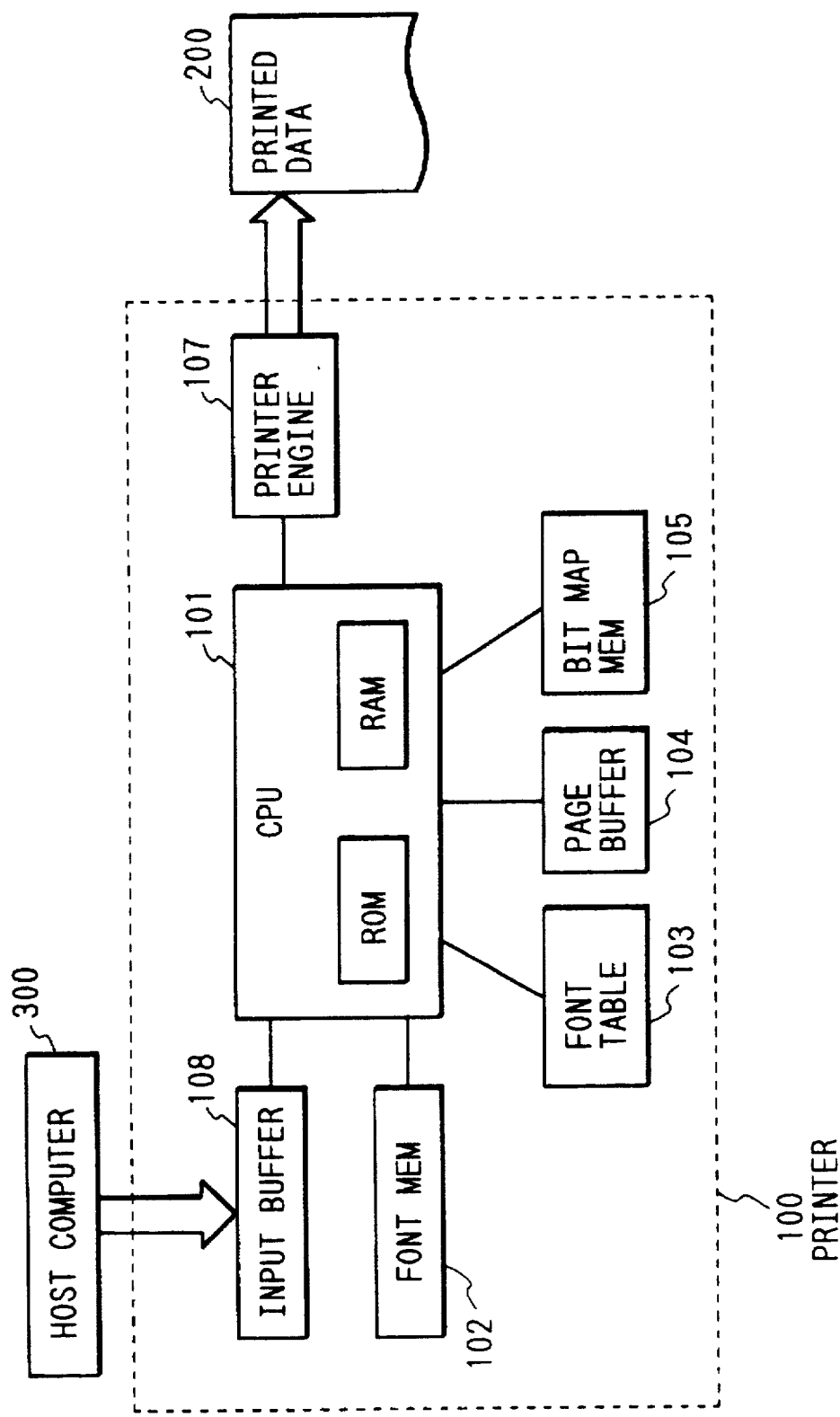
FIG. 14 is a block diagram for explaining the arrangement of a conventional printing device.

FIG. 1 which is a block diagram for explaining a control arrangement in a printing device in one embodiment of the present invention and in which like reference numerals are used to denote parts like to those shown in FIG. 14, there are shown a font table 1 which can store therein scaler indices shown in FIG. 2 and which will be hereinbelow explained, and a scalable data table 2 which will be hereinbelow explained with reference to FIG. 3. At first explanation will be made of a process for communication with a host computer.

During printing, a printer drives or the like in an application soft stored in a host computer transmits character code data to which control data are added to a receiving buffer which temporarily stores the data for analyzing whether the data are control commands or character codes. Thus analyzed data are stored for every one page in a page buffer memory 104 with intermediate codes, and upon outputting, the data are delivered to a printer engine part 107 developed in a bit map memory 105. As to the control commands, there are presented a size unit designating command, a printing position shifting command, a graphic set designating command, a pitch designating command, a size designating command, a stroke weight designating command, a style designating command, a type face designating command, a character set name selecting command, a character set registering command, and the like. With the use of these commands, a position to be printed and a font are determined, and a character pattern is outputted with a character code in a selected font at the time when the character code is transmitted. It is noted that whether the font format can be developed with a certain scaler or not is determined in accordance with the data of the selected character set, and then a scaler is selected. Further, the preferential ranks or priority rankings as sometimes referred to hereinafter of the scalers have been beforehand stored in the table (the preferential ranks are composed of those which have been provided in the program), and those which are given as data of scalers (command parameters) during down-load, and the determination is made with the preferential ranks thereof. Further, the order or the preferential ranks can be changed under a command (control command) or by setting at a panel.

Referring to FIG. 2, which shows the detailed arrangement of the font table 1 shown in FIG. 1, the table 1 consists of names of all fonts, attributes, pointers, indices of font scalers and flags. Incorporated fonts, fonts in a font card and the user registered fonts are arranged in the mentioned order in the table.

Referring to FIG. 3, which is a view showing a detailed arrangement of a scaler data table shown in FIG. 1, names of scalers incorporated in a printer, preferential levels (scaler levels), storage levels and pointers (indicating scalers with which the characters are actually developed) to font developing functions for the scalers are stored in the scaler data table 2, and are sorted in the order of the preferential levels.

Further, among the scalers having the same preferential level, the registered one is located in a higher preferential rank, and among the registered those, the one having a later registered order number is located in a higher preferential rank. The indices of the table 2 are stored in a scaler index table shown in FIG. 2.

Under actual character processing circumstances, it is expected that a plurality of scalers exist, having different levels. Further, upon energization of the printer, the above-mentioned table 2 is created in a RAM area in the CPU 101, and thereafter, data are added in accordance with preferential levels given by the user as scaler data during down-load each time when a scaler is down-loaded from the host computer 300, and indices are replaced while indices in the font table are also updated.

In the thus arranged printing device, scaler data are added and registered in the scaler data table 2 and the font table 1 by the control part for setting a preferential rank for selecting any one of the scalers, or the CPU 101 in accordance with preferential ranks set in the host computer 300, and the one having a higher preferential rank is selected as a character output font while referring to the attributes of font concerning the inputted character data. Thus, a scaler and a font which are suitable for generating a character pattern corresponding to the inputted data are selected under the character processing circumstances in which a plurality of scalers and a plurality of fonts are included.

Further, the CPU 101 selects a font having a higher preferential rank corresponding to a limited proposed scaler, and then selects a font corresponding to the limited scaler with a less number of process steps.

Further, the CPU 101 registers register levels in order to distinguish scalers registered in the memory means (RAM) from a host computer 300 or the like from previously registered scalers, and preferentially selects the thus acquired scalers.

Further, the CPU 101 generates a status for outputting a scaler list containing therein scaler levels and register levels stored in the scaler data table 2 or a font list containing scaler indices registered in a font table 1, and informs the user of the scaler list or the font list on a predetermined output device (such as the printing device or a display unit belonging to the host computer). It is noted that the printer engine part 1 is used as the output device 107 for printing out the scaler list and the font list.

Further, with the result of the determination by the CPU 101, whether a scaler corresponding to an external character is stored in a predetermined memory medium (such as a memory card, a hard disc (HD), MO, ROM, RAM) or not is determined, and with the result of this determination, the generation of the pattern for the external character is controlled so as to generate either the external character or a registered font in dependence upon whether the scaler corresponding to the external character is registered or not.

Explanation will be hereinbelow made of the operation of a font generating process in the printing device according to the present invention with reference to flow-charts shown in FIGS. 4A and 4B.

Figure 4B:
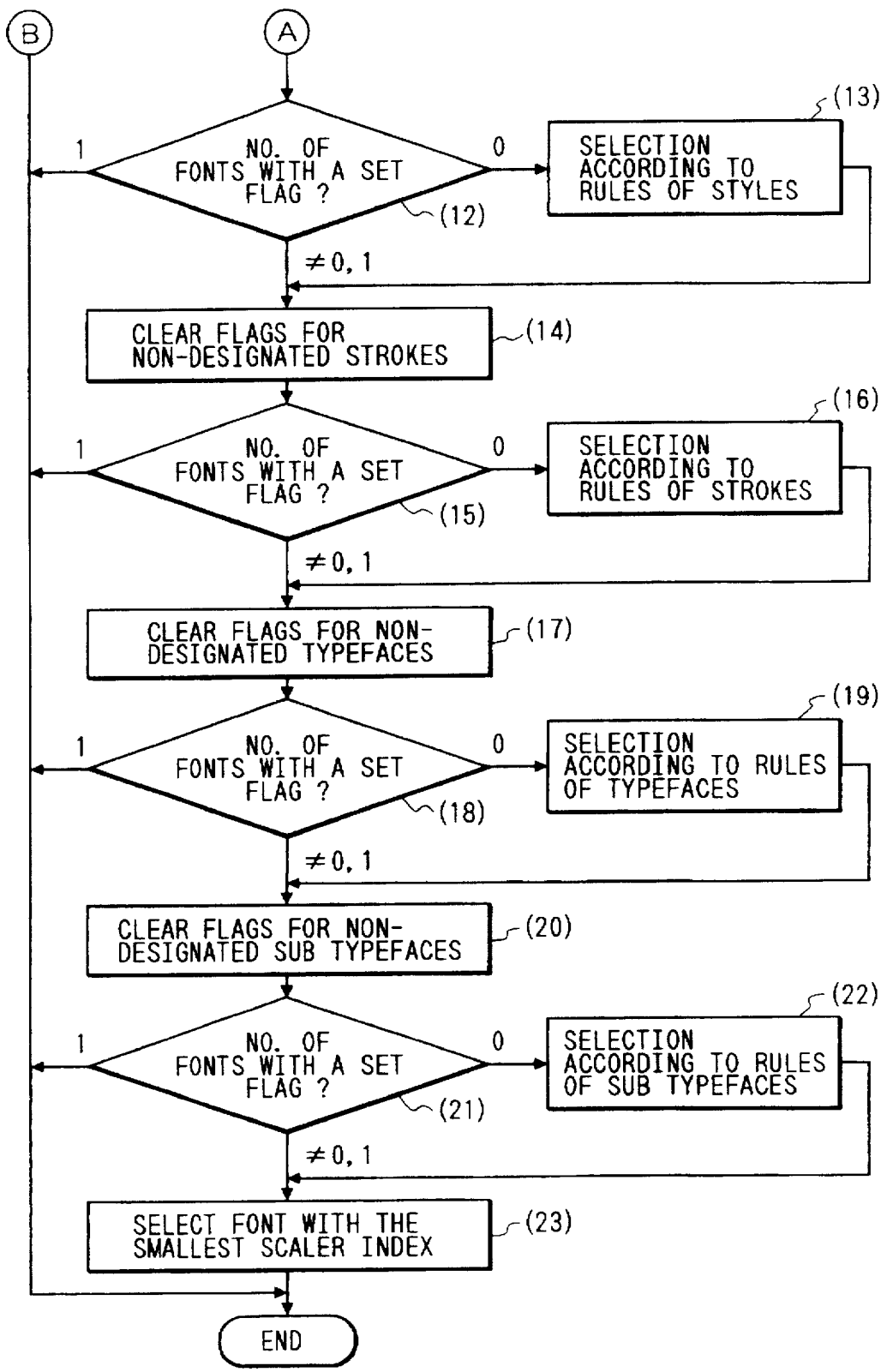
FIG. 4 is comprised of FIG. 4A and FIG. 4B showing flow-charts illustrating an example of a font selecting process in the printing device according to the present invention.

Referring to FIGS. 4A and 4B, which are flow-charts showing an example of the font selecting process in the printing device according to the present invention, the process comprises steps (1) to (23) which are stored in a ROM in the CPU 101.

It is noted that the preferential ranks of the attributes are similar to those in the conventional one. Further, the printing device in this embodiment searches fonts if an attribute of a font is designated under a command or by setting at the control panel, including the other attributes which have been set at that time.

First, at step (1), all flags for fonts in the font tables are set.

Further, after flags for fonts other than a graphic set designated at step (2) are all cleared, whether the number of raised flags is one or not is examined (step (3)). If it is one, the printing is carried out with the use of the font thereof. Further, no raised flags are present, a flag for the font of the graphic set at present is set in accordance with the selecting rule for the graphic set (step (4)). Further, if a plurality of fonts for which flags are set remain, the procedure is advanced to step (5), flags for fonts having character pitches other than the designated one are cleared. Then, similar to the case of the above-mentioned graphic set, the number of remaining fonts is checked (step (6)), and if it is one, the determination is made, but if it is zero, the process is made in accordance with the selecting standard of the attribute (step (7)). Meanwhile if it is more than one, the procedure is carried out for the next attribute.

Subsequently, the process is similarly carried out for a character size, a style, a stroke weight, a type face and an auxiliary type face through steps (8) to (22).

Further, if only one of them cannot be finally selected at step (23), a font having a smallest index is selected among fonts which remain in the table and for which the flags are set.

Next, explanation will be made of a printing process with reference to FIG. 5. In the case of printing the selected font, whether a designated character code has a pattern or not is determined (step (1)), and if has not a pattern, whether a font having the same attribute is present or not is confirmed in accordance with the same attribute font table. If a font having the same attribute is present, the outputting is carried out with a pattern of the font (step (3)). If no font having the same attribute is present, no character procedure is made (step (4)) ("□" is outputted as an undefined code, or a space is outputted). If the designated code has a pattern, the outputting is made with the designated font (step (5)).

At this time, the CPU 101 refers to the scaler data table 2. If fonts having the same attribute are present with the same scaler level, the user's external character can be processed under circumstances in which a plurality of scalers are included, by carrying out such control that it is outputted as a user's external character.

<Scaler Data Transmitting Procedure>

Next, explanation will be hereinbelow made of a process of transmitting scaler data and font data to the user.

Figure 7:
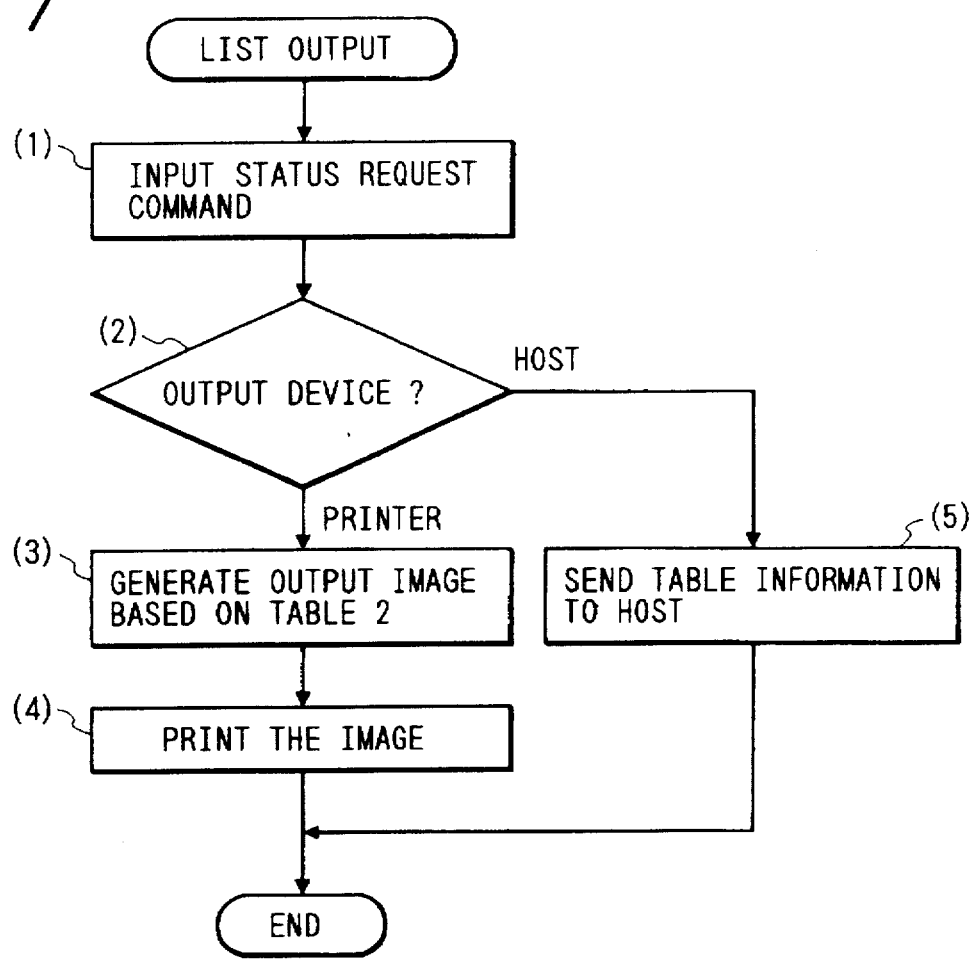
FIG. 7 is a view illustrating an example of a list output process according to the present invention.
Figure 8:
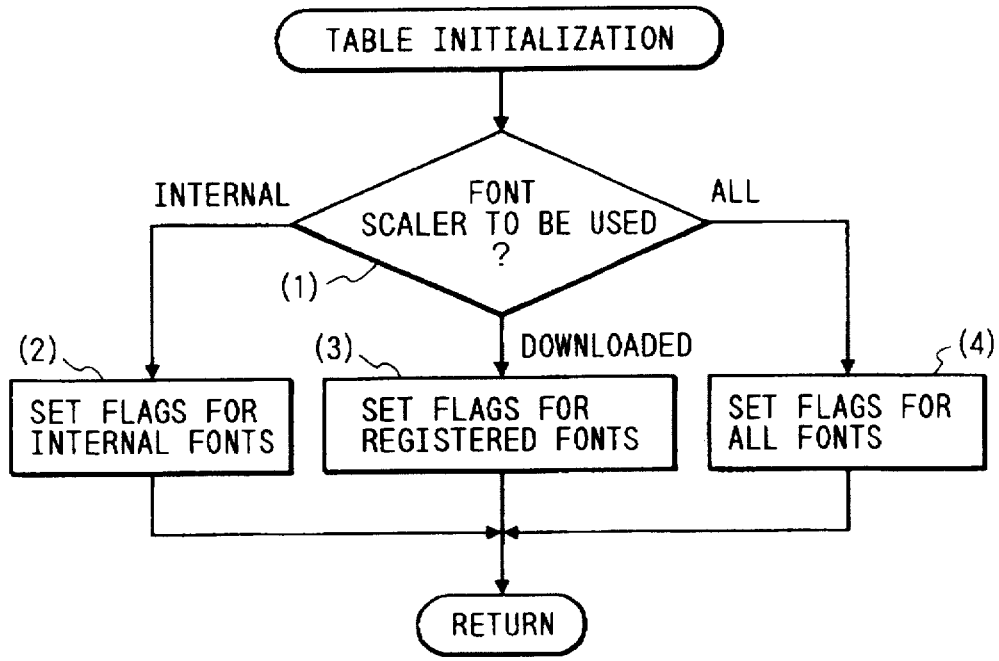
FIG. 8 is a flow-chart showing an example of a table initializing process according to the present invention.

Referring to FIG. 6 which shows an output example of the font list according to the present invention, the font table shown in FIG. 2, and the scaler data table shown in FIG. 3 are outputted by printing or displaying by manipulating the panel 109. A control procedure will be explained with reference to FIG. 7. At the time when a manipulation input is made at the control panel 109 (at the time when a status request or a command is inputted), an output destination is determined in accordance with a designation by the command (step (2)). And in the case of the designation of the printing output or in the case of the manipulation of the panel, an output image is developed in the bit map memory 105 through the intermediary of the page buffer memory 104 with reference to the scaler data table 2 which is prepared in the RAM area in the CPU 101, and is then outputted from the printer engine part 107 (step (4)). In the case of no designation by the host computer, the transmission to the host computer is made with the use of the table data as a status (step (5)).

Further, if the font data and the scaler data are requested by a status request command, the data are transmitted to the user with reference to the respective tables. The user can optionally build up font using circumstances which satisfy the user's desire in accordance with these data.

Through the above-mentioned procedure, even though a plurality of fonts having the same attribute are present, the setting can be made by confirming the scaler and font list, and accordingly, a font satisfying the user's need can be selected.

<Scaler Preferential Rank Determining Procedure>

Although preferential levels are registered as data for down-loaded scalers in the above-mentioned embodiment, this can be realized through simple manipulation of the panel as exemplified in detail hereinbelow with reference to the drawings.

Before a font is selected as explained in this embodiment, the setting is made at the panel or under a command from the host computer in such a way that the user uses an incorporated scaler or a down-loaded scaler, but he uses all scalers.

In this embodiment, at the initialization of the tables at step (1) in the flow-chart as shown in FIG. 4A for explaining the font selecting procedure in the CPU 101, not only all flags for fonts are set but also flags for fonts which are set in accordance with the font scaler data in the font table and in accordance with the pervious setting (step (1)) under the command as shown in FIG. 5 are set (steps (2) to (4)).

Subsequently, a font is selected similar to the conventional procedure so as to select a font which satisfies the user's need through simple panel manipulation or the like.

<External Character Printing Procedure>

Although a scaler to be used is set through simple setting at the panel in the above-mentioned embodiment, an external character may be constituted by using a font having a different scaler. Explanation will be hereinbelow made in detail of this case.

Figure 9:
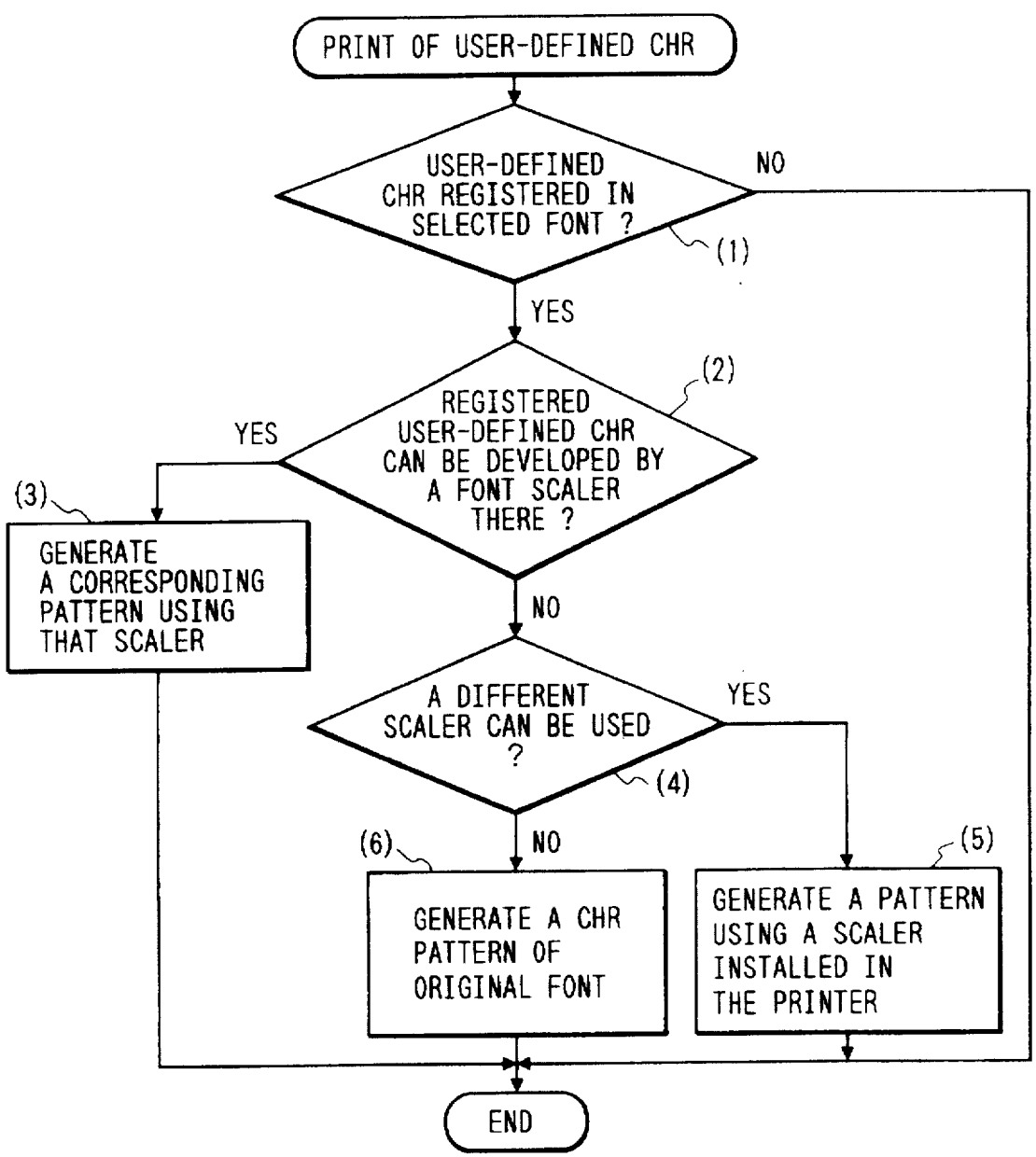
FIG. 9 is a flow-chart showing an example of an external character printing process according to the present invention.

An external character printing procedure in the printing device arranged as shown in FIG. 1 will be explained with reference to FIG. 9. Whether an external character is registered in a selected font or not is determined (step (1)), and if it is registered, whether the font format of the registered external character can be developed with the user of the scaler of the font in which the external character is registered, or not is determined (step (2)).

If it can be developed, a pattern generating process is carried out for the external character with the use of the scaler of the font in which the external font is registered (step (3)), but if it cannot be developed, the designation by the command is determined. If a different scaler can be used by the command, a pattern for the external character is generated with the use of a scaler material source incorporated in the printer (step (5)).

Further, if it is set such that a different scaler cannot be used by the command, a character pattern in an original font corresponding to the code of the registered external character is generated (step (6)). Accordingly, in the external character circumstances in which a plurality of fonts having the same attribute but having different kinds of scalers, if the scaler of the registered external character does not coincide with the scaler of the font in which the external character is registered, the generation of the character pattern of the registered external character can be controlled.

With the use of the procedure as mentioned above, a flexible external character pattern generating process can be carried out in accordance with a kind of a scaler of the registered external character and a kind of a scaler of a font in which the external character is registered.

<Explanation of Font Format>

Figure 10:
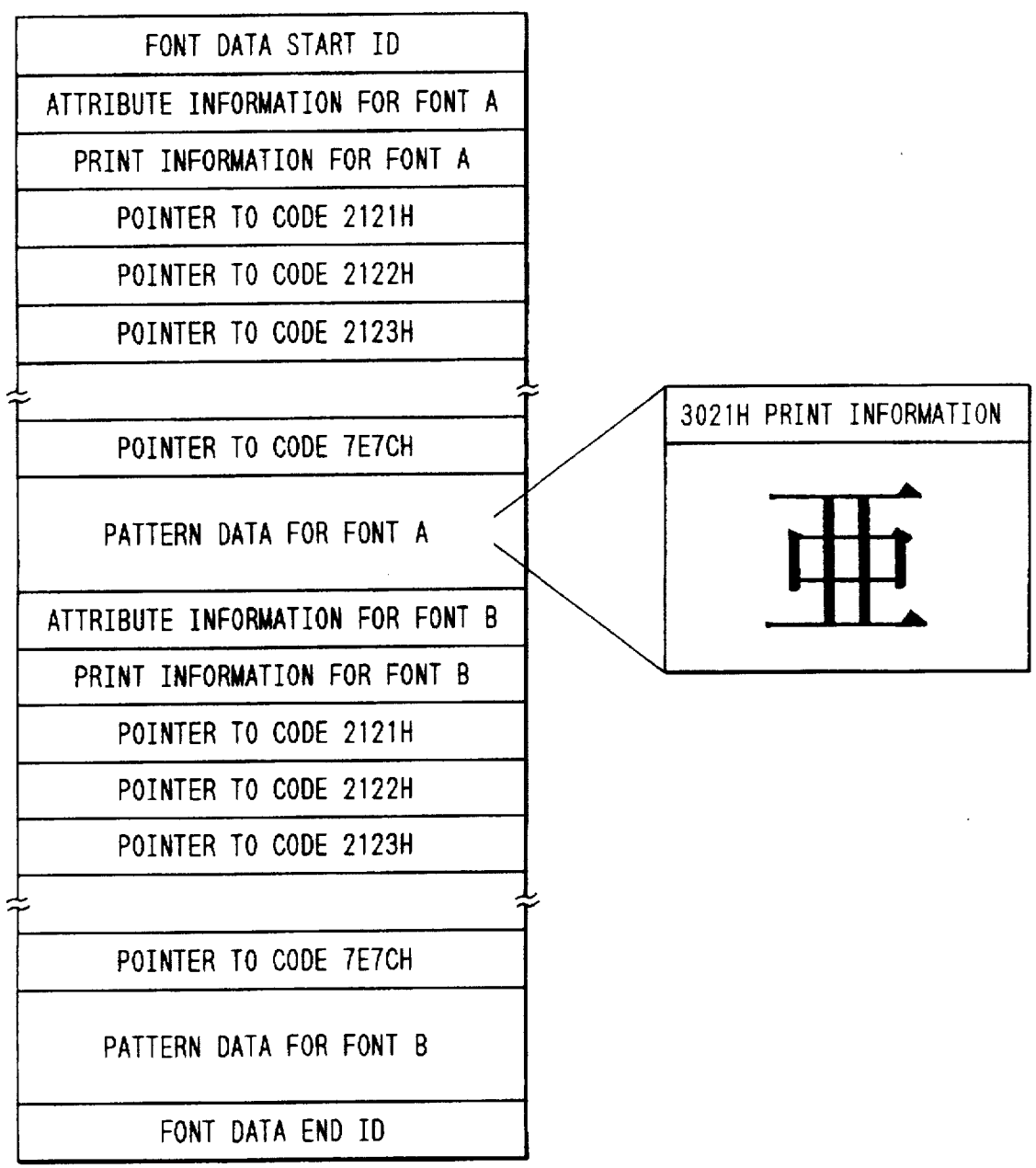
FIG. 10 is a view illustrating an example of a font format of a scaler in the printing device according to the present invention.

FIG. 10 is a view for explaining an example of the above-mentioned font format.

As shown in this figure, original font formats having developable scalers, have attribute data and printing data (positions of underlines, a maximum character size and the like) per font unit, printing data per character, printing data (outline data) per character, and further index (pointer) data thereof.

<Printing Procedure>

Figure 11:
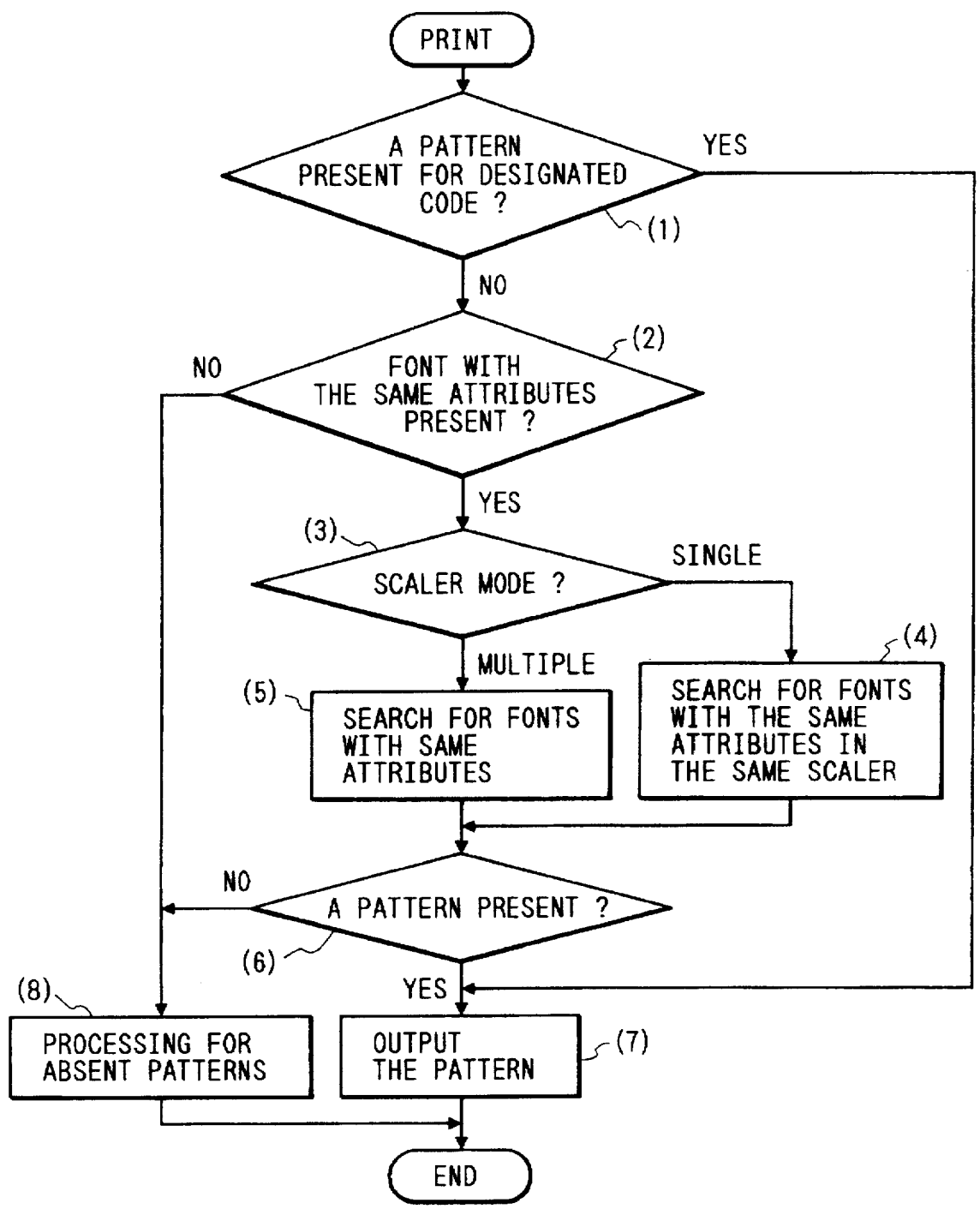
FIG. 11 is a flow-chart showing an example of a printing process according to the present invention.

Next, explanation will be hereinbelow made of a printing procedure with reference to FIG. 11. Specifically, before selection of a font, either a single scaler mode or a multi-scaler mode is carried out is set by setting at the panel 109 or under a command. The CPU 101 stores in the RAM area the above-mentioned scaler mode.

When the selected font is printed, whether a designated character code has a pattern or not is determined (step (1)), and if it has not a pattern, whether a font having the same attribute is present or not is confirmed (step (2)), if a font having the same attribute is present, the reference is made to the above-mentioned scaler mode (step (3)). In the case of the single scaler mode, the search is made for only fonts having the same attribute and having the identical scaler, but no reference is made to fonts having different scalers. If the character code has a pattern, the pattern is outputted (step (7)), but it has not, no pattern process is carried out (step (8)).

Meanwhile, if a pattern exists in a font having the same attribute and an identical scaler, the pattern is outputted. Further, in the case of the multiscaler mode, the search is made for a font having the same attribute (step (5)), irrespective of whether the scaler is identical or not, and whether it has a pattern or not is determined. If it has a pattern, the pattern is outputted (step (7)). If it has not a pattern, no pattern process is carried out (step (8)). By designating the scaler mode, a font which cannot be selected due to its degree of priority can be selected.

A specific selection and output example will be hereinbelow made with reference to FIGS. 17A to 17C.

Referring to FIGS. 17A to 17C, as to fonts A, B and C which have been processed with the same attribute font table and the same attribute font process, if the fonts A and C use incorporated scalers, and if the font B is the data for the font scalers used in an application in the host computer, that is, if the font B is an external font created by the application in the host computer, since only font patterns having the identical scaler are outputted in the single scaler mode, no pattern of the font B is outputted. In the multiscaler mode, patterns are outputted in the priority order of the font A, the font B and the font C similar to the conventional example.

[Another Embodiment]

Although the explanation has been made in detail of such a case that the preferential ranks of the scalers are independently used as tables, explanation will be hereinbelow made of such an arrangement that a font can be selected without being unconscious of the font having the same attribute, during normal printing, so as to decrease the capacity of the memory.

First, the numbers of the auxiliary type faces having the lowest preferential rank will be explained. Numbers from 0 to 255 are allocated to the numbers of the auxiliary type faces in order to determine differences of designs which are slightly different from one another due to companies who design the fonts and due to differences of the scalers, among font type faces such as Ming-cho type face, a Gothic type face and the like.

Since the storage configurations of the fonts are different from each other between the bit map type and the scalable type, they are denoted by different numbers.

These type face numbers have a lowest preferential rank, and accordingly, in such a case that only one font cannot be selected, a font having an auxiliary type face number identical with a designated one is selected, but if no identical one is present, a font having a smaller auxiliary type face number is selected.

As to the auxiliary type face numbers, a different number is set to every scaler, and further, a small number is attached to a scaler having a higher preferential number upon registration or in a previously registered condition so that the preferential ranks of the scalers can be set without largely changing the font selecting process in the conventional single scaler circumstances.

Explanation will be hereinbelow made of an embodiment in which the preferential ranks of the scalers are absorbed in accordance with an auxiliary type face number.

Referring to FIG. 12 which shows details of a font table in this embodiment, the font table is composed of all names of fonts incorporated in the printing device, and attributes, pointers, pointers to font developing functions, and flags. Further, the font table is created in the RAM upon energization of the power source or upon registration of font data/font scalers. If no scaler for developing font data has been present, no table is created.

Incorporated fonts, fonts in a font card and user registered fonts are arranged in the table in the mentioned order, with the use of the font table, the font selecting process is carried out, similar to the conventional one, and accordingly, data of a selected font are delivered to the font developing function so that a character can be developed. Further, the way of setting of an auxiliary type face number upon registration of a font will be explained in detail.

Upon registration of a font, it is registered having a graphic set number, character pitches, a character size, a style, a stroke weight and a type face number which are the same as those of an incorporated font. If it is desired that the font is handled not as an external character but as an independent font, the auxiliary type face number is set to be different from those of the incorporated fonts. Further, if it is desired that the font is handled having a preferential rank higher than those of the incorporated fonts, the auxiliary type face number is set to be small. This setting is made by a command. On the contrary, if it is desired that the font is registered as an external character, the external character can be registered by identically setting the attributes of the incorporated characters, including the auxiliary type face numbers upon registration.

Such registration control can be made by the use referring to a status or a font list or under the command. However, an exclusive font down-loader is provided in order to facilitate the setting.

[Another Embodiment]

Although the explanation has been made in detail of such a case that the preferential ranks of the scalers are independently used as tables, explanation will be hereinbelow made of such an arrangement that a font can be selected without being unconscious of the font having the same attribute, during normal printing, so as to decrease the capacity of the memory.

First, the numbers of the auxiliary type faces having the lowest preferential rank will be explained. Numbers from 0 to 255 are allocated to the numbers of the auxiliary type faces in order to determine differences of designs which are slightly different from one another due to companies who design the fonts and due to differences of the scalers, among font type faces such as Ming-cho type face, a Gothic type face and the like.

Since the storage configurations of the fonts are different from each other between the bit map type and the scalable type, they are denoted by different numbers.

These type face numbers have a lowest preferential rank, and accordingly, in such a case that only one font cannot be selected, a font having an auxiliary type face number identical with a designated one is selected, but if no identical one is present, a font having a smaller auxiliary type face number is selected.

As to the auxiliary type face numbers, a different number is set to every scaler, and further, a small number is attached to a scaler having a higher preferential number upon registration or in a previously registered condition so that the preferential ranks of the scalers can be set without largely changing the font selecting process in the conventional single scaler circumstances.

Explanation will be hereinbelow made of an embodiment in which the preferential ranks of the scalers are absorbed in accordance with an auxiliary type face number.

Referring to FIG. 12 which shows details of a font table in this embodiment, the font table is composed of all names of fonts incorporated in the printing device, and attributes, pointers, pointers to font developing functions, and flags. Further, the font table is created in the RAM upon energization of the power source or upon registration of font data/font scalers. If no scaler for developing font data has been present, no table is created.

Incorporated fonts, fonts in a font card and user registered fonts are arranged in the table in the mentioned order, with the use of the font table, the font selecting process is carried out, similar to the conventional one, and accordingly, data of a selected font are delivered to the font developing function so that a character can be developed. Further, the way of setting of an auxiliary type face number upon registration of a font will be explained in detail.

Upon registration of a font, it is registered having a graphic set number, character pitches, a character size, a style, a stroke weight and a type face number which are the same as those of an incorporated font. If it is desired that the font is handled not as an external character but as an independent font, the auxiliary type face number is set to be different from those of the incorporated fonts. Further, if it is desired that the font is handled having a preferential rank higher than those of the incorporated fonts, the auxiliary type face number is set to be small. This setting is made by a command. On the contrary, if it is desired that the font is registered as an external character, the external character can be registered by identically setting the attributes of the incorporated characters, including the auxiliary type face numbers upon registration.

Such registration control can be made by the use referring to a status or a font list or under the command. However, an exclusive font down-loader is used so as to automatically set the defaults (the setting of the defaults is made so that a down-loaded font and an incorporated font can be designated as explained latter) in order to facilitate the setting.

Further, upon registration, even in such a case that an auxiliary type face number inherent to a scaler is set by an exclusive tool or an application for font scalers or a font data, it is possible to cope therewith by use of an attribute rewriting command.

Naturally, even in the case of using the above-mentioned font table arrangement, the scalers can be limited through the panel or under a command. Further, more flexible countermeasure can be made by changing auxiliary type face numbers in accordance with a registered level.

Next, a font selecting procedure in the CPU 101 in this embodiment will be explained with reference flow-charts shown in FIGS. 13A and 13B.

Figure 13B:
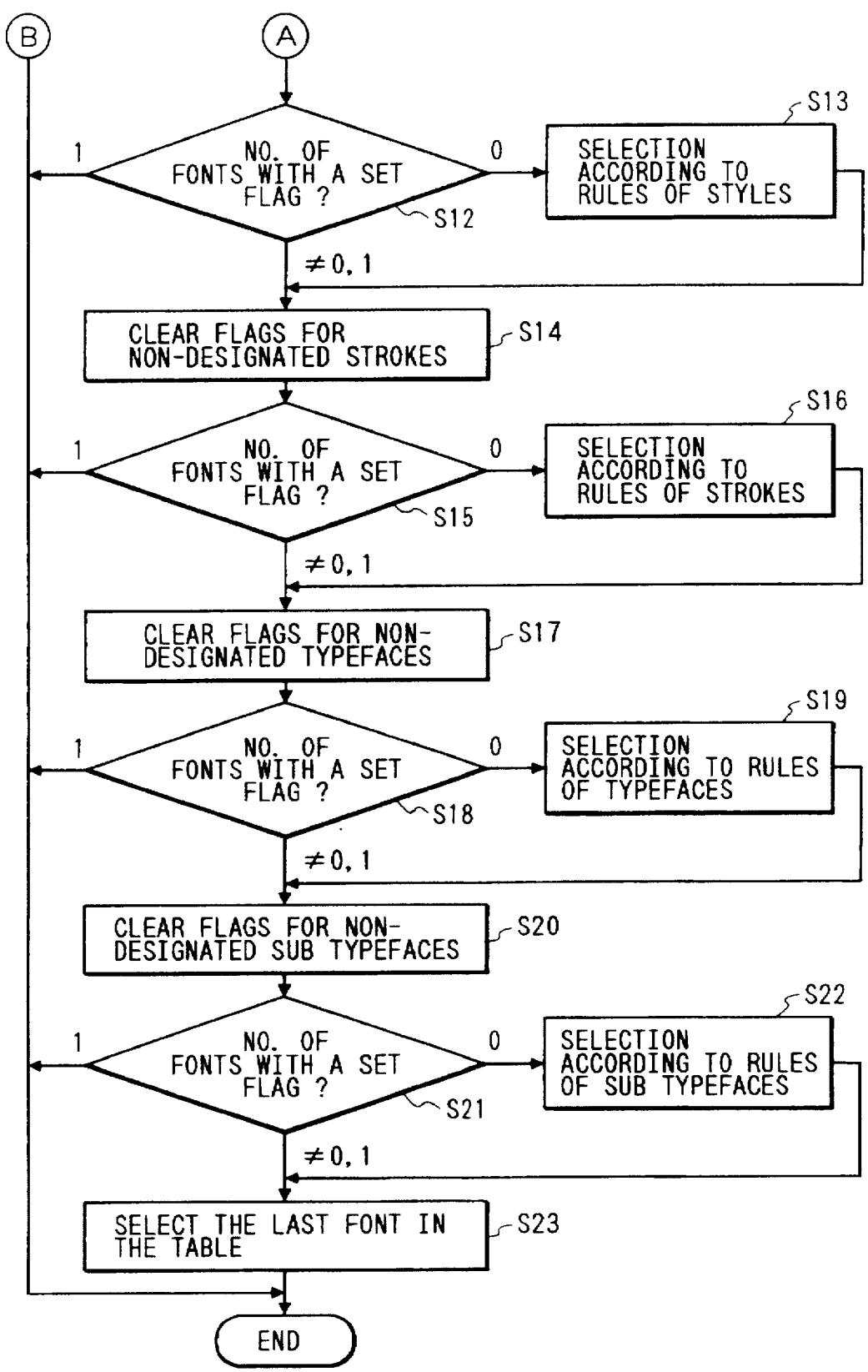
FIG. 13 is comprised of FIG. 13A and FIG. 13B showing flow-charts illustrating an attribute selecting process in the other embodiment of the present invention.

It is noted that a program relating to flow-charts shown in FIGS. 13A and 13B are stored in the ROM.

When an attribute of a font is designated by setting at panel or under a command, the search for the font can be carried out, including other attributes having set at that time.

First, at step S1, all flags for fonts in the font table are set. Further, after all flags for fonts other than a graphic set designated at step S2 are cleared, whether the number of fonts for which flags are raised, becomes one or not is determined (step S3). If it is one, the printing is made with the use of the font. If no font for which a flag is raised is present, a flag for a font in the graphic set which has been set at present is set under a selecting rule for the graphic set (steps 4). Further, if more than one of fonts for which flags are set remain, the procedure is advanced to step S5, flags for fonts having character pitches other than the designated one are cleared. Then the number of remaining fonts is checked, similar to the graphic set (step S6), and if it is one, the determination is made, but if it is not one, the process is made in accordance with a selecting standard for the attributes (steps 7). If more than one of fonts remain, the procedure is advanced in order to process the next attribute. Subsequently, the process is similarly repeated for a character size, a style, a stroke weight, a type face and an auxiliary type face. During the process of locating an auxiliary type face number, the auxiliary type face number can be located, including the preferential ranks of scalers. If only one can not be finally located, it is satisfactory that a font for which a final flag in the table is set, is selected, and if a character is actually developed, printing can be made with the use of pointers to developing functions in the font table while a scaler can be automatically determined (step S23).

According to the embodiments explained above, since the printing is made with the use of a font and a scaler used for display on the host computer and down-loaded into the printer in accordance with the specification of an application, a printer driver on the host computer correspondingly sets an attribute of the font, and then transmits the same to the printer. Further, since the printing is made with the use of a font and a scaler incorporated in the printer in accordance with the specification of the application, the printer driver on the host computer correspondingly set an attribute and transmits the same to the printer.

With this arrangement, it is possible to carry out printer control in accordance with a specification of an application in the host computer.

According to the above-mentioned embodiments, since there are provided means for setting the preferential ranks of scalers, means for storing the thus set preferential ranks, means for selecting fonts in accordance with the stored preferential ranks, means for locating a scaler to be selected, means for selecting an output font among fonts having the located scaler, means for storing down-load levels of scalers, means for determining preferential ranks from stored data, means for outputting a list of scalers and data including preferential ranks, as a status, from the device, means for carrying out search so as to determine whether a font down-loaded as an external character is present of not among the selected fonts which are outputted, and means for developing the external character with a scaler corresponding to a down-loaded font format if the font registered as an external character is present, only one font can be selected, and a process optimum for the external character can be selected even though more than one of fonts having the same attribute are present in the printer.

It is noted that the present application can be applied not only to a system composed of several equipments, but also to an apparatus composed of only one equipment. Further, it goes without saying that the present invention can be applied to the case in which the printing is achieved by supplying a program to the system or the equipment.

Further, in the above-mentioned embodiments, although the examples in which the output control apparatus according to the present invention is incorporated in the printing device, have been explained, the output control apparatus can be independently formed, and can be systematically combined with a printing device, a host computer and the like.

As mentioned above, since the registering means adds and registers scaler data in the memory means and in the font table in accordance with preferential ranks set by the setting means for setting the preferential ranks for selecting any one of the scalers, and the selecting means selects a font having a higher preferential rank as a character output font while referring to font attributes of inputted character data, a scaler and a font which are suitable for generating a character pattern corresponding to the inputted character data can be selected in such character processing circumstances that includes a plurality of scalers and a plurality of fonts.

Further, since the limiting means for limiting proposed scalers selected from the memory means is provided, and since the selecting means selects a font having a higher preferential rank corresponding to a proposed scaler limited by the limiting means, as a character output font, a font corresponding to a delimited scaler can be selected with a less number of manipulation steps.

Further, the registering means registers a registered level for distinguishing a scaler registered in the memory means by the acquiring means from a previously registered scaler, and accordingly, an acquired scaler can preferentially be selected.

Further, since the list data generating means generates status for outputting a scaler list containing scaler levels stored in the memory means in accordance with a list output to be inputted and registered levels or a font list containing scaler indices registered in the font table, the user can be informed of the scaler list and the font list on a predetermined output device.

Further, since the second external character determining means determines whether the font format of the registered external character can be developed by a scaler of a font in which the external character is registered or not, in accordance with a result of determination by the first external character determining means, the first external character control means can control the generation of a pattern for the external character so as to generate the pattern corresponding to the external character with the use of a scaler material source to be incorporated even though the scaler of the font in which the external character is registered, can not be developed.

Further, since the second external character control means controls the development of the pattern for the registered external character in accordance with a result of determination by the determining means for determining whether a kind of the scaler of the font in which the external character is registered coincides with a kind of font scalers of the registered external character or not, the generation of the character pattern of the registered external character can be limited in such a case that the scaler of the registered external character does not coincide with the scaler of the font in which the external character is registered even in the external character circumstances in which a plurality of fonts having the same attribute but having different kinds of scalers are registered.

Further, in such a case that the determining means determines that a kind of a scaler of a font in which an external character is registered does not coincide with a kind of a scaler of the registered external character, the third external character control means carries out a different character pattern process for the registered external character in accordance with a scaler mode selected and set by the setting means, and accordingly, a flexible character pattern process can be made in accordance with a kind of a scaler of a registered external character and a kind of a scaler of a font in which the external character is registered.

Accordingly, the present invention can offer the following advantages, that is, even in a character processing device in which a plurality of fonts having the same attribute exist, the selection and output of a font which satisfies the user's desire can be made, and accordingly, it is possible to perform a more friendly character generating process; and further, the generation of the pattern of an external character is carried out by determining the conditions of a scaler of the registered external character and the registered scaler, thereby it is possible to perform a user friendly external character process.

Further, in the above-mentioned embodiments, the present invention has been explained as to the arrangements using leaser beam printers, the present invention can be applied to a printer such as an ink-jet printer or a thermal printer, or a display unit such as a CRT or a liquid crystal display unit.

What is claimed is:

1. An output control apparatus comprising:
   memory means for storing therein a plurality of fonts, a plurality of font attributes in correspondence to respective fonts, and a plurality of font scalers, each font attribute including scaler information on a font scaler, the scaler information including a priority ranking;
   selection means for selecting one of the plurality of fonts stored in said memory means, wherein, when there are a plurality of fonts having the same attributes except for scaler information, said selection means selects the one font in accordance with the scaler information; and
   development means for developing the one font selected by said selection means into bit data with one of the font scalers stored in said memory means corresponding to the scaler information for the selected font.

2. An output control apparatus as set forth in claim 1, further comprising output means for outputting characters with the use of a font selected by said selecting means.

3. An output control apparatus as set forth in claim 2, wherein said output means is a printer or a display unit.

4. An output control apparatus as set forth in claim 1, wherein the fonts are stored as outline font data or stroke type font data.

5. An output control apparatus as set forth in claim 1, further comprising a host computer for outputting data to be outputted.

6. An output control apparatus as set forth in claim 1, wherein said plurality of fonts comprises a scaler downloaded from a host computer.

7. An output control apparatus as set froth in claim 1, wherein said plurality of scalers comprises a scaler downloaded form a host computer.

8. An output control apparatus as set forth in claim 1, further comprising means for setting the priority ranking of the scaler information.

9. An output control apparatus as set forth in claim 1, further comprising:
   first means for determining whether an external character is registered in a font selected by said selecting means or not; and
   second means for determining whether said external character, if it is registered, can be developed by use of a scaler corresponding to said font in which said external character is registered, or not.

10. An output control apparatus as set forth in claim 9, further comprising first means for generating said external character by use of a scaler selected from said plurality of scalers stored in said memory means if said determining means determines that development of said character is impossible.

11. An output control apparatus as set forth in claim 9, further comprising second means for generating a character in an original font corresponding to said registered external character.

12. An output control apparatus as set forth in claim 10, further comprising means for selecting either one of said first and second generating means.

13. An output control method which uses memory means which stores therein a plurality of fonts, a plurality of font attributes in correspondence to respective fonts, and a plurality of font scalers, each font attribute including scaler information on a font scaler, the scaler information including a priority ranking, said method comprising the steps of:
   selecting one of the plurality of fonts stored in the memory means, wherein when there are a plurality of fonts having the same attributes except for scaler information, said selection means selects the one font in accordance with the scaler information; and
   developing the one font selected in said selection step into bit data with one of the font scalers stored in the memory means corresponding to the scaler information for the selected font.

14. An output control method as set forth in claim 13, wherein an output means outputs a character by use of a font selected by said selecting step.

15. An output control method as set forth in claim 14, wherein said output means is a printer or a display unit.

16. An output control method as set forth in claim 13, wherein the fonts are stored as outline font data or stroke type font data.

17. An output control method as set forth in claim 13, further comprising the step of inputting data to be outputted from a host computer.

18. An output control method as set forth in claim 13, wherein said plurality of fonts includes a font down-loaded from a host computer.

19. An output control method as set forth in claim 13, wherein said plurality of scalers includes a scaler down-loaded from a host computer.

20. An output control method as set forth in claim 13, further comprising the step of setting the priority ranking of the scaler information.

21. An output control method as set forth in claim 13, further comprising:
- a first step of determining whether an external character is registered in a font selected in said selecting step or not when characters are outputted by use of that font; and
- a second step of determining whether the external character can be developed or not with use of a scaler corresponding to said font in which the external character is registered, if it is determined in said first determining step that the external character is registered.

22. An output control method as set forth in claim 21, further comprising a step of generating the external character by use of a scaler selected from the plurality of scalers stored in the memory means if it is determined in said second determining step that development of the external character is impossible.

23. An output control method as set forth in claim 21, further comprising a step of generating a character in an original font corresponding to the registered external character if it is determined in said second determining step that development of the external character is impossible.

24. An output control method as set forth in claim 22, further comprising a step of selecting said generating step.

25. An output control apparatus as set forth in claim 11, further comprising means for selecting either one of said first and second generating means.

26. An output control method as set forth in claim 23, further comprising a step of selecting said generating step.

* * * * *

UNITED STATES PATENT AND TRADEMARK OFFICE
CERTIFICATE OF CORRECTION

PATENT NO. : 5,761,395
DATED : June 2, 1998
INVENTOR(S) : YUKI MIYAZAKI, ET AL.

Page 1 of 3

It is certified that error appears in the above-identified patent and that said Letters Patent is hereby corrected as shown below:

IN THE DRAWINGS

Figure 16B:
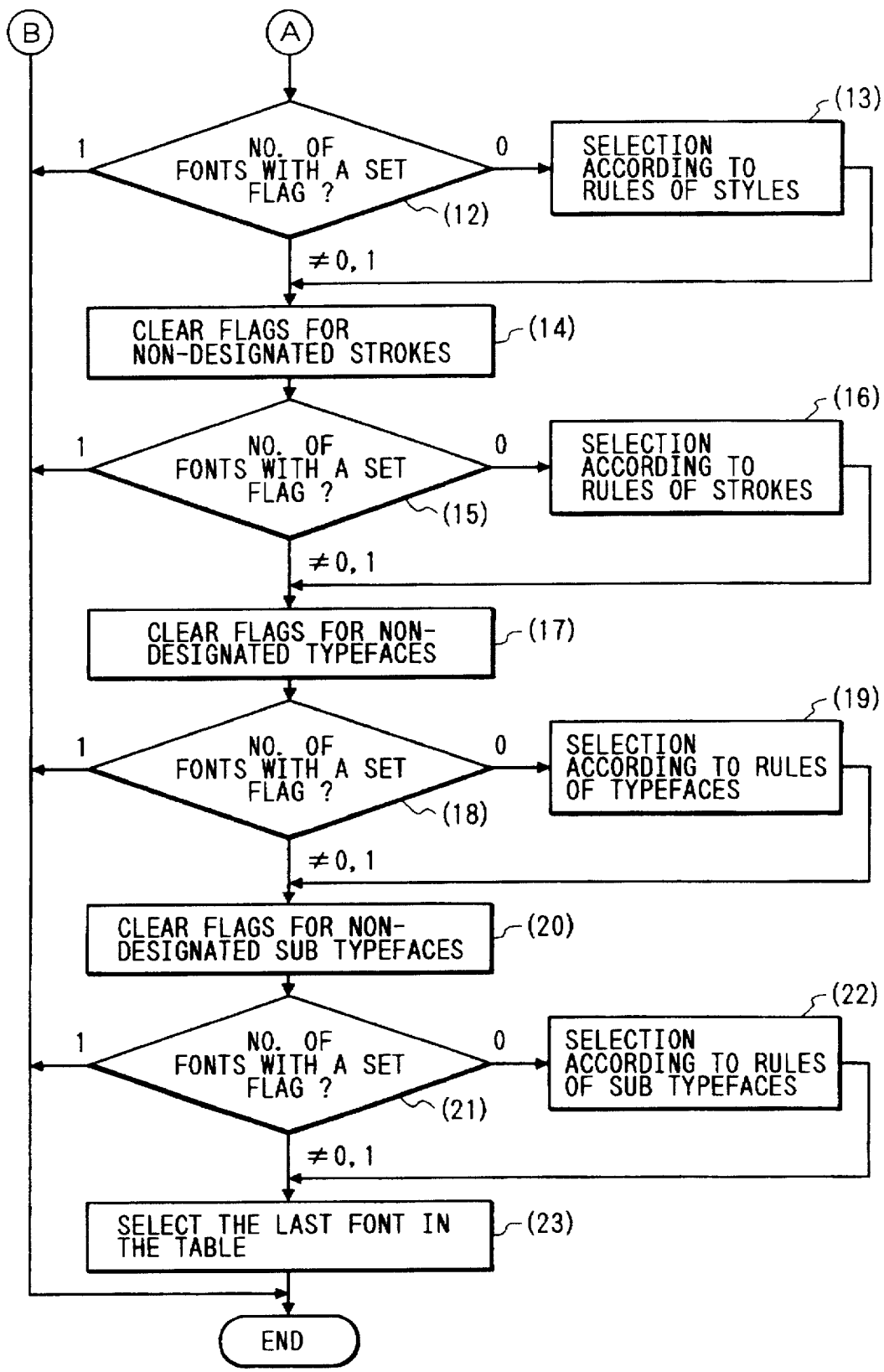
FIG. 16 is comprised of FIG. 16A and FIG. 16B showing flow-charts illustrating an example of a conventional font selecting process.

Sheet 4, Figure 4A, "ACCORDINGS"
    should read --ACCORDING--;
Sheet 13, Figure 13A, "ACCORDINGS"
    should read --ACCORDING--; and
Sheet 17, Figure 16A, "ACCORDINGS"
    should read --ACCORDING--.

COLUMN 1

Line 45, "is" should be deleted; and
Line 54, "font" (second occurrence)
    should read --the font--.

COLUMN 2

Line 27, "only" should read --any--;
Line 34, "table" should read --table,--;
Line 37, "in" should read --in the--; and
Line 63, "not" should read --not have--.

COLUMN 3

Line 2, "is" should read --are--;
Line 8, "attributes" should read --attributes of--; and
Line 28, "and" should read --and more--.

COLUMN 4

Line 13, "invention:" should read --invention;--;
Line 32, "like to" should read --like--; and
Line 40, "an" should be deleted.
Line 41, "soft" should read --software-- and
    "computer" should read --computer, and--.

UNITED STATES PATENT AND TRADEMARK OFFICE
CERTIFICATE OF CORRECTION

PATENT NO. : 5,761,395

DATED : June 2, 1998

INVENTOR(S) : YUKI MIYAZAKI, ET AL.

It is certified that error appears in the above-identified patent and that said Letters Patent is hereby corrected as shown below:

COLUMN 6

Line 27, "no" should read --if no--.

COLUMN 7

Line 63, "registered," should read --registered-- and "not" should read --not,--.

COLUMN 8

Line 33, "is carried" should read --to be carried-- and "by setting" should be deleted; and
    Line 46, "but" should read --but if--.

COLUMN 10

Line 3, "use" should read --user--.

COLUMN 11

Line 6, "use" should read --user--;
    Line 10, "latter)" should read --later)--; and
    Line 22, "reference" should read --reference to--;
    Line 25, "are" should read --is--; and
    Line 66, "set" should read --sets--.

COLUMN 12

Line 15, "of" should read --or--.

UNITED STATES PATENT AND TRADEMARK OFFICE
CERTIFICATE OF CORRECTION

PATENT NO. : 5,761,395

DATED : June 2, 1998

INVENTOR(S) : YUKI MIYAZAKI, ET AL.

It is certified that error appears in the above-identified patent and that said Letters Patent is hereby corrected as shown below:

COLUMN 13

Line 47, "leaser" should read --laser--.

COLUMN 14

Line 14, "froth" should read --forth--; and
Line 16, "form" should read --from--.

Signed and Sealed this

Eleventh Day of May, 1999

Attest:

Q. TODD DICKINSON

Attesting Officer

Acting Commissioner of Patents and Trademarks